(12) United States Patent
Klinker (10) Patent No.: US 7,898,970 B2
(45) Date of Patent: Mar. 1, 2011

(54) METHOD FOR END TO END ROUTE CONTROL

(75) Inventor: James Eric Klinker, Oakland, CA (US)

(73) Assignee: Internap Network Services Corporation, Atlanta, GA (US)

( * ) Notice: Subject to any disclaimer, the term of this patent is extended or adjusted under 35 U.S.C. 154(b) by 147 days.

(21) Appl. No.: 12/252,183

(22) Filed: Oct. 15, 2008

(65) Prior Publication Data
US 2009/0040938 A1 Feb. 12, 2009

Related U.S. Application Data

(62) Division of application No. 11/063,057, filed on Feb. 22, 2005, now Pat. No. 7,447,153.

(60) Provisional application No. 60/545,773, filed on Feb. 19, 2004.

(51) Int. Cl.
*H04L 12/26* (2006.01)
*G06F 15/173* (2006.01)
(52) U.S. Cl. ............................ 370/248; 370/252; 709/224
(58) Field of Classification Search ........................ None
See application file for complete search history.

(56) References Cited

U.S. PATENT DOCUMENTS

| 6,363,056 | B1 * | 3/2002 | Beigi et al. | 370/252 |
| 7,269,157 | B2 | 9/2007 | Klinker et al. | |
| 7,336,615 | B1 * | 2/2008 | Pan et al. | 370/248 |
| 7,620,037 | B1 * | 11/2009 | Bhaskaran et al. | 370/356 |
| 2002/0184393 | A1 | 12/2002 | Leddy et al. | |
| 2006/0015607 | A1 | 1/2006 | Fava et al. | |
| 2006/0155872 | A1 | 7/2006 | Charzinski et al. | |
| 2006/0182034 | A1 * | 8/2006 | Klinker et al. | 370/238 |

OTHER PUBLICATIONS

Floyd, S. et al, "Random Early Detection Gateways for Congestion Avoidance," IEEE/ACM Transactions on Networking, Aug. 1993.
Demichelis, C. et al., "IP Packet Delay Variation Metric for IP Performance Metrics" (IPPM), RFC3393, Nov. 2002.
Schulzrinne, H. et al., "RTP: A Transport Protocol for Real-Time Applications," RFC 3550, Jul. 2003.
Robustelli, A.L. et al., "Prototype of an Adaptive Voice Coder for IP Telephony," Proceedings of the 2003 International Conference on Software Telecommunications and Computer Networks—SoftCom 2003, Oct. 7-10, 2003, pp. 859-863, Split, Dubrovnik (Croatia), Ancona, Venice (Italy).

* cited by examiner

*Primary Examiner* — Nittaya Juntima
(74) *Attorney, Agent, or Firm* — Kilpatrick Townsend & Stockton LLP (57) ABSTRACT

Session independent end to end route control is provided by coordination between a pair of route control devices. Each device determines whether received traffic qualifies for end to end route control and whether the device at the other end supports end to end route control. If so, then the route control devices determine a routing mode, such as tunneling or address translation, and routing parameters. The performance of the selected path is monitored and is changed if the performance becomes unacceptable. Path performance can be measured using one-way measurement techniques that use a common inbound path or a control channel.

13 Claims, 11 Drawing Sheets

| Pair | Latency | Loss | Jitter | MOS |
|------|---------|------|--------|-----|
| A,D | 124ms | 3.3% | High | Poor |
| A,E | 117ms | 3.1% | High | Poor |
| B,D | 64ms | 1.2% | Low | Good |
| B,E | 75ms | 1.3% | Low | Good |
| C,D | N/A | 100% | N/A | N/A |
| C,E | 77ms | 1.2% | Med | Avg |

| Pair | Latency | Loss | Jitter | MOS |
|---|---|---|---|---|
| A,D | 94ms | 2.3% | High | Poor |
| A,E | 87ms | 2.1% | High | Poor |
| B,D | 34ms | 0.2% | Low | Good |
| B,E | 45ms | 0.3% | Low | Good |
| C,D | N/A | 100% | N/A | N/A |
| C,E | 47ms | 0.2% | Med | Avg |

FIG. 11

METHOD FOR END TO END ROUTE CONTROL

RELATED APPLICATION

This application is a divisional of U.S. patent application Ser. No. 11/063,057, filed Feb. 22, 2005, now U.S. Pat. No. 7,447,153, which claims priority to U.S. Provisional Application No. 60/545,773 entitled "End to End Route Control" filed Feb. 19, 2004, each of which is incorporated herein by reference.

FIELD OF THE INVENTION

The present invention is directed to network routing and, more particularly to end to end route control.

BACKGROUND

Traditional route control techniques rely upon a single device to manage inbound and outbound routing. The device is typically located at the network edge for the source or the destination. Although there are some route control techniques that use devices operating at each end, the devices operate independently. Since the devices do not coordinate their path selection, the devices may not select the best paths. Thus, there is a need for a route control technique that provides coordinated end to end route control.

Traditional route control techniques are also session dependent, i.e. the same network path is used for the lifetime of the session. One disadvantage of session dependent techniques is that path changes can only be made at the start of a new session. Changes cannot be made within the session. Although this may be acceptable for some applications, there are many applications, such as VoIP and video sessions, where this is not acceptable. Thus, there is a need to provide route control that can make path changes within a session.

Route control requires some degree of network diversity, which has been traditionally achieved through multi-homing. A location is multi-homed if there are multiple network service providers that serve the location. However, it is not always practical for every location to be multi-homed since multi-homing can be expensive and labor intensive. For example, remote branch offices may be single-homed and yet still need to run mission critical operations across a network. Traditional route control techniques are not applicable to single-homed locations. Thus, there is a need to provide route control that can provide network diversity when one of the endpoints is single-homed.

SUMMARY

The present invention meets the needs described above by providing session independent end to end route control. Each end to end route control device determines whether the traffic associated with a session satisfies its criteria for end to end route control. If it does, then it determines whether the route control device associated with the other endpoint also supports end to end route control. If so, then the route control devices exchange routing configuration information and negotiate an end to end routing mode and end to end routing parameters. The route control devices monitor the performance of the selected paths and if the performance becomes unacceptable, then a new path is selected. Path selection is session independent, meaning that path changes can occur during a session.

The end to end routing modes include tunneling and address translation and can be implemented using a single path or multiple paths. Path performance information can be obtained using one-way measurements. One method of measuring one-way path performance is to use different outbound paths and a common inbound path. Another method is to use synchronized clocks at each endpoint and to communicate performance information via a control channel.

These and other aspects, features and advantages of the present invention may be more clearly understood and appreciated from a review of the following detailed description of the disclosed embodiments and by reference to the appended drawings and claims.

DETAILED DESCRIPTION

The present invention provides session independent end to end route control. Briefly described, each route control device determines whether the received traffic qualifies for end to end route control and whether the route control device at the other end supports end to end route control. If so, then the route control devices exchange configuration information and negotiate a routing mode and routing parameters. The routing modes include tunneling and address translation. The performance of the selected path is monitored and can be changed if the performance of the path becomes unacceptable. Path performance can be measured using one-way measurement techniques that use a common inbound path or a control channel.

Introduction to Route Control

Route control is a method of making inbound and outbound routing decisions based on path performance measurements and control methods. Once the routing decisions are made, the routing decisions are implemented so that selected paths are used for routing. The following sections provide some background information about certain aspects of route control, which are applicable to end to end route control.

Measurements

Measurement methods are used to assess the performance of the selected paths, as well as the performance of alternate candidate paths, and to collect usage and flow volume information for bandwidth management. The information can be obtained using a variety of techniques, including passive monitoring and active probes.

Passive monitoring can be used to determine network latency, network packet loss, network jitter, and flow volume, as well as other specific measurements, such as server response time, etc.

As used herein the term "jitter" refers to the variation in packet delay. Jitter can be determined by measuring the median delay value of a packet train. For N delay measurements from a packet train probe, N−1 jitter measurements can be calculated, where N is >=2. The jitter values for the active measurements are the absolute value of the delay value−median delay value. The jitter of the packet train is the average of the individual jitter values.

A moving average for each measurement by prefix and path must be maintained. One such technique is provided in the RED algorithm for determining average queue size:

$$avg \leftarrow (1-w_q)avg + w_q q$$

where $w_q$ is $\geq 0.001$. This may implemented as $$avg \leftarrow avg + w_q(q-avg).$$

If implemented, $w_q$ may be system-defined or user configurable.

The mean opinion score (MOS) score is based on the subjective human opinions of call quality and can be estimated by latency, loss and jitter measurements. Typical values for MOS are between 1 and 4.5. Toll quality is typically associated with MOS values above 4.0. Cellular quality is typically deemed acceptable and is associated with MOS values between 3.6 and 4.0. MOS values below 3.6 are typically considered poor quality.

Active probes are often used to measure candidate inbound and outbound network performance. Other active measurements include timing a reverse DNS lookup or an application's download or response time. SNMP interface polling is used to collect link and provider utilization information.

Controls

Control methods select a path based on path measurement information. For example, a control method for bandwidth management can distribute network load based on historical link usage and provider billing contracts. Many of the control methods used for traditional route control can be used with end to end route control. However, the methods may need to be more sophisticated when applied end to end. For example, control decisions may need to be made in near real-time for end to end route control, instead of minutes, as in tradition route control techniques.

Implementations

Once the control method makes a routing decision, the decision must be implemented. There are a number of common routing implementations that can be used with end to end route control. However, none of the implementations, by themselves, supports session independent end to end route control, where both the inbound path and the outbound path are controlled and path changes can be made during a session.

Common implementations include network protocol, dynamic NAT, dynamic DNS, and outgoing interface selection. Network protocol implementations include existing network protocols, such as BGP. Network protocol implementations are typically outbound only. Dynamic NAT uses address spaces that are unique to specific network service providers. A packet with a source address associated with a provider will return via that provider. A shortcoming of NAT is that it is session dependent. Dynamic DNS can control inbound routing. As DNS queries are resolved into IP addresses, a dynamic server issues addresses from a specific provider block so that inbound session traffic arrives via the selected provider. Like dynamic NAT, dynamic DNS is session dependent. Outgoing interface selection allows the selection of the outbound path by either the selection of a particular outgoing interface or by relying upon downstream routing components for policy-based routing. As its name implies, outgoing interface selection are outbound only.

Additional route control implementations are discussed in U.S. application Ser. No. 09/833,219 entitled "System and Method to Assure Network Service Levels with Intelligent Routing" filed Apr. 10, 2001, U.S. application Ser. No. 10/013,809 entitled "Routing Control of Information over Data Networks" filed Dec. 7, 2001, U.S. application Ser. No. 10/040,902 entitled "System and method to Provide Routing control of Information over Networks filed Dec. 28, 2001, U.S. application Ser. No. 10/286,576 entitled "Data Network Controller" filed Nov. 1, 2002, U.S. application Ser. No. 10/662,108 entitled "Clustering Employing Topological Groupings, Distance Measurements and Structural Generalizations" filed Sep. 12, 2003, U.S. application Ser. No. 10/735,589 entitled "Topology Aware Route Control" filed Dec. 12, 2003, and U.S. application Ser. No. 10/774,445 entitled "Methods and Systems for Providing Dynamic Domain Name System for Inbound Route Control" filed Feb. 10, 2004, each of which is incorporated herein by reference.

Exemplary Operating Environment

Figure 1:
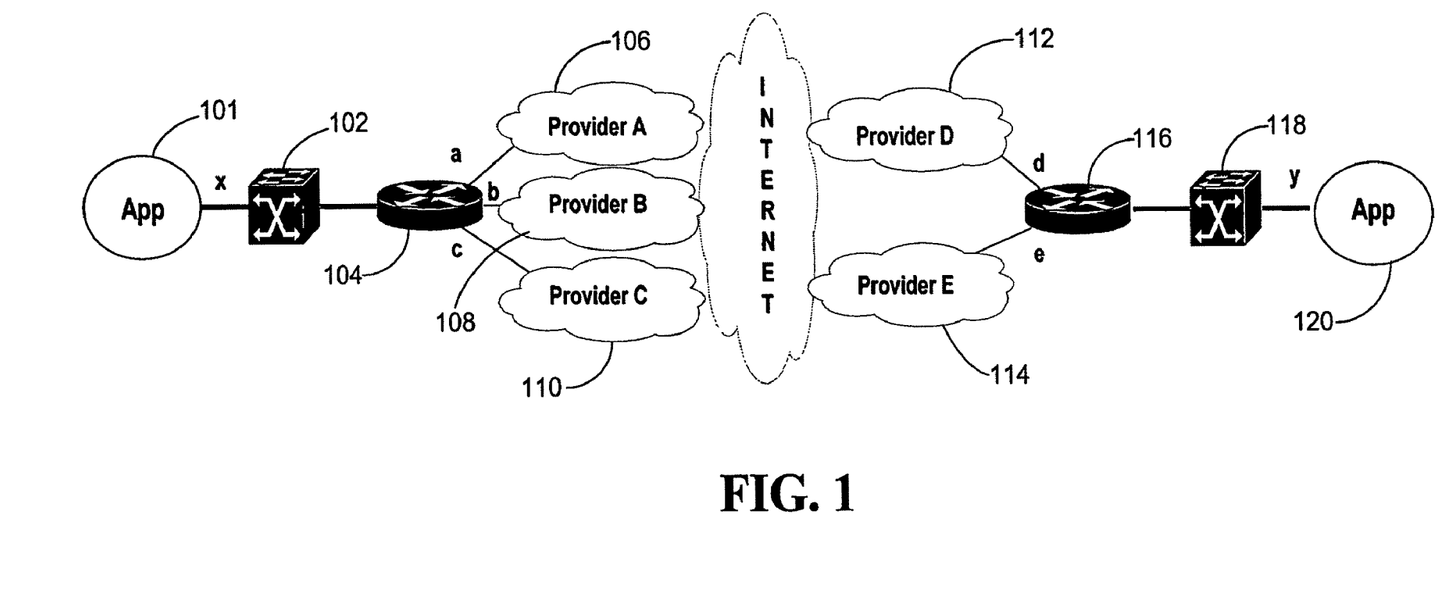
FIG. 1 is a block diagram illustrating endpoints and an exemplary network configuration.

FIG. 1 illustrates a simple network. The network includes two endpoints, a source 101 and a destination 120, and two route control devices, a source route control device 102 and a destination route control device 118. The network also includes routers 104 and 116 and multiple network service providers. There are three source network service providers, Provider A 106, Provider B 108 and Provider C 110, and two destination network service providers, Provider D 112 and Provider E 114. Each provider is associated with a particular address space. Provider A is associated with address space "a", Provider B is associated with address space "b", Provider C is associated with address space "c", Provider D is associated with address space "d" and Provider E is associated with address space "e". Inbound routing (routing into an endpoint) to an address space associated with a provider is through that provider. For example, packets destined for address space "a" will arrive via Provider A. Although the Internet is shown in FIG. 1, the invention is not limited to the Internet and can operate with any collection of networks. In addition, the providers can be any type of network, including public or private networks.

Figure 2A:
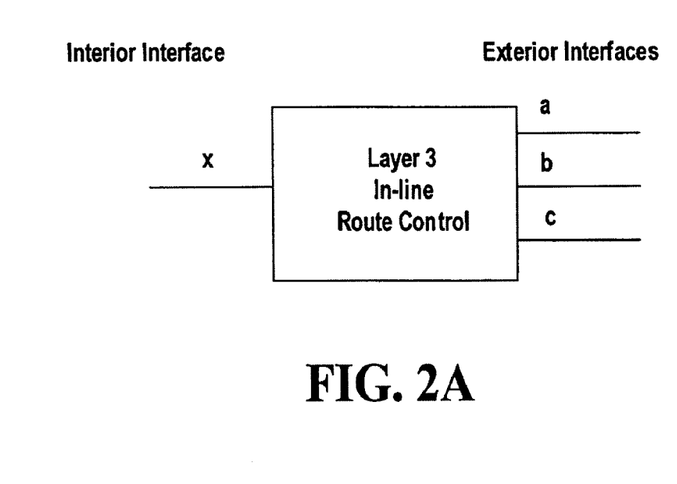
FIG. 2A is a block diagram of the external interface of a route control device, in accordance with an embodiment of the invention.
Figure 2B:
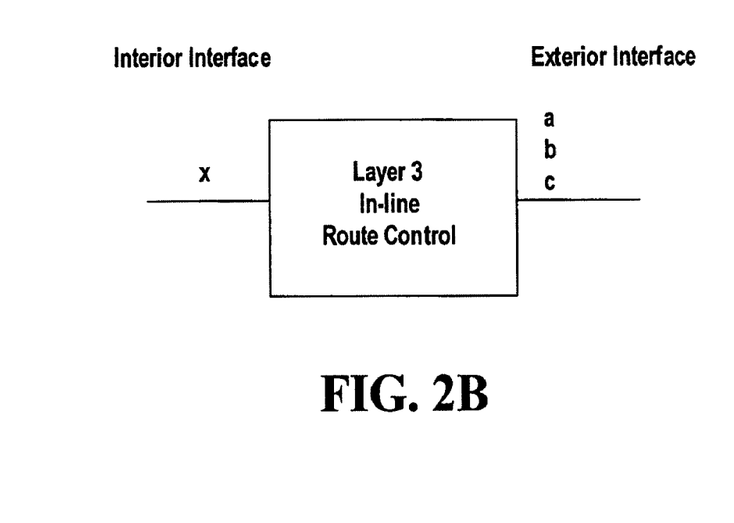
FIG. 2B is a block diagram of the external interface of another route control device, in accordance with an embodiment of the invention.

FIGS. 2A and 2B illustrate layer 3 mechanisms used by the route control devices to control outbound routing (routing from an endpoint). FIG. 2A illustrates a route control device with multiple exterior interfaces. This route control device routes out towards a specific provider using the exterior interface that corresponds to that provider. FIG. 2B illustrates a route control device with a single exterior interface that uses secondary addresses. The secondary addresses correspond to providers and are used by a downstream router to route out a specific interface corresponding to the provider.

Layer 2 mechanisms, such as VLANs, use the address space of other components, such as router interfaces, to implement the selected routes. Although packets are still manipulated as they are bridged from one interface to the next, the destinations of the packets are not the bridging device. Other layer 3 components at the endpoint are used. The invention contemplates outbound routing using any of these layer 3 or layer 2 mechanisms.

Exemplary Method for End to End Route Control

Figure 3:
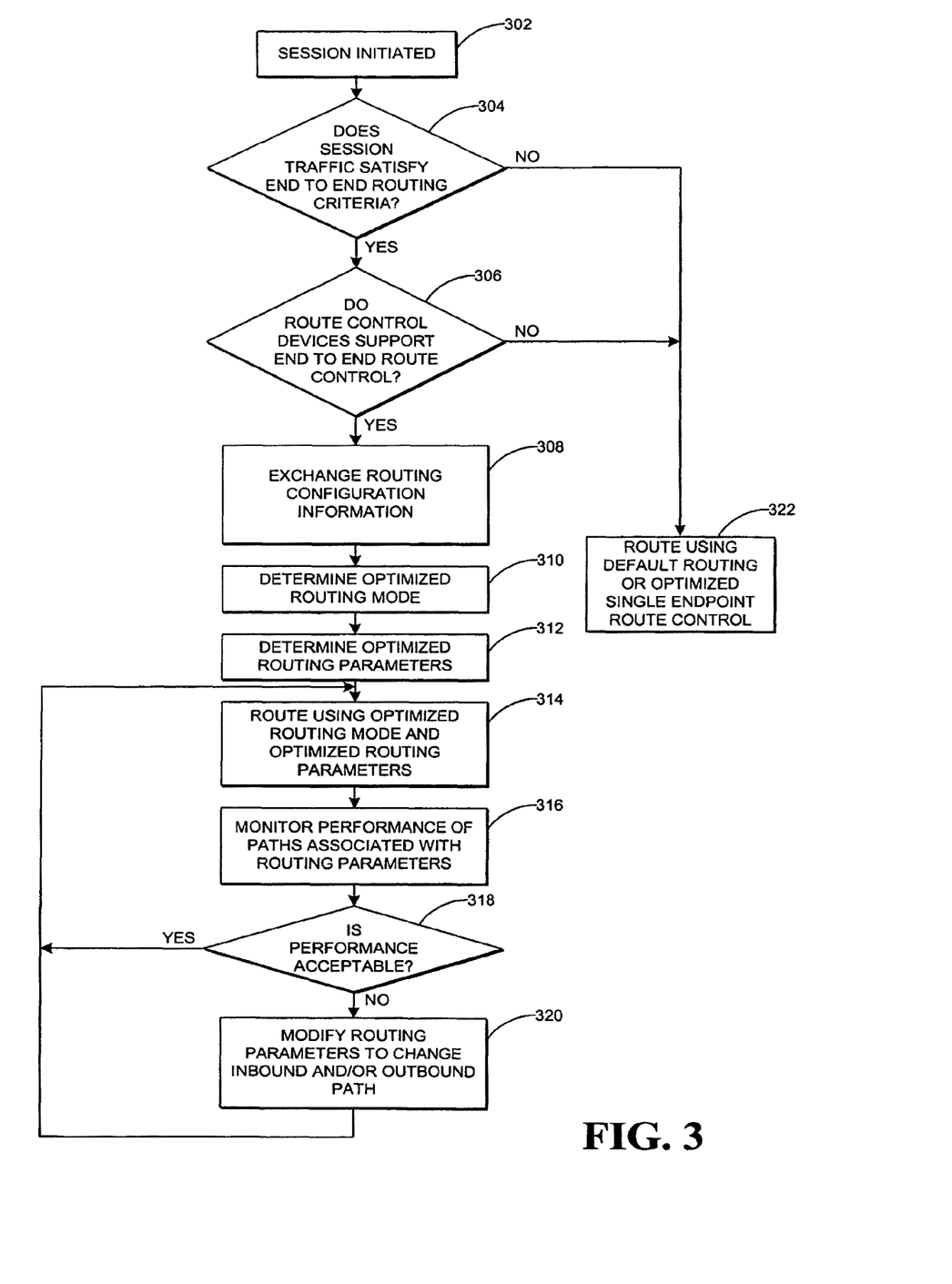
FIG. 3 is a flow diagram for a method of end to end route control, in accordance with an embodiment of the invention.

FIG. 3 illustrates an exemplary method for end to end route control. In step 302, a session is initiated by an application at the source and the source route control device begins routing traffic associated with the session to the destination route control device. In step 304, the destination route control device determines whether the session traffic satisfies its criteria for end to end route control. In one embodiment, the criteria includes traffic associated with a customer that has selected a particular service level or traffic associated with a particular type of application, such as VoIP, video conferencing or on-line gaming. Preferably, the determination of whether the session traffic satisfies the criteria for end to end route control is deployed close to or on the application. Typically, a policy is established by the user and programmed onto the route control device itself. The amount of traffic that does not match the criteria decreases dramatically as the determination is moved closer to the application and eventually to the network stack of the application.

If the traffic qualifies for end to end route control, then the Yes branch is followed to step 306 and the source route control device and the destination route control device, if present, communicate to determine whether they both support end to end route control. In one embodiment, the source route control device communicates with the destination route control device via a predetermined port. If the destination route control device supports end to end route control, then it responds to the communication from the source route control device. A disadvantage of using a predetermined port is that a destination route control device that does not support end to end route control may not know how to respond. Another disadvantage is that the communication from the source route control device might be interpreted as malicious by security elements at the destination route control device.

An alternative is to mark packets with a known identifier to establish the presence of another route control device. An advantage of marking is that it does not disrupt the applications at the source and the destination. A packet can be marked using the DSCP fields or other discretionary elements of the headers.

Yet another alternative is to use pre-configuration to identify all route control devices that support end to end route control, the addresses associated with the devices and a common set of optimization filters to each device prior to any routing. Once traffic matches the common filter, the devices negotiate to determine a routing configuration. This is similar to the way that secure associations utilized by IPSec operate. For IPSec the negotiation is typically performed using the ISAKMP protocol. Thus, this alternative can extend ISAKMP for route control. Pre-configuration requires that an operator pre-configure all known route control devices with all other known route control devices, which becomes burdensome as the number of end to end devices increases. As will be apparent to those skilled in the art, there are other ways that the route control devices can become aware of each other's end to end route control capabilities, all of which can be used with the present invention.

If the determination is that the source route control device and the destination route control device both support end to end route control, and if the traffic satisfies the optimization filters used by both route control devices, then the method proceeds to step 308. In step 308, the source route control device and the destination route control device exchange routing configuration information, such as address information associated with the available providers at each end.

Once the routing configuration information is exchanged, the route control devices determine an optimized routing mode based on the information exchanged in step 310. The optimized routing modes include tunneling (single path and multi-path) and address translation and are described in more detail below. The optimized routing parameters to implement the optimized routing mode are determined in step 312 and include addresses for the providers selected at each end. Traffic is routed using the optimized routing mode and the optimized routing parameters between the source and the destination in step 314.

In step 316 the performance of the paths corresponding to the routing parameters is monitored. The source route control device monitors the performance of the outbound path from the source to the destination and the destination route control device monitors the performance of the path from the destination to the source. In step 318 a determination is made as to whether the measured performance of the paths is acceptable. If the determination in step 318 is that the path performance is acceptable, then the Yes branch is followed back to step 314 and routing continues using the existing path. If the performance is not acceptable, then the No branch is followed to step 320 and the routing parameters are modified to change the inbound and/or outbound path. Once the path(s) have been modified, then the method returns to step 314 and routing continues with the new path.

If the determination in step 304 is that the session traffic does not satisfy the end to end routing filters or the determination in step 306 is that the route control devices do not support end to end route control, then the respective No branches are followed to step 322 and routing is performed using the default route control or optimized single endpoint route control as provided by traditional route control techniques.

Routing Modes

The end to end routing modes include single path and multipath tunneling and address translation.

Tunneling and Encapsulation

One optimized end to end routing mode includes tunneling between the source route control device and the destination route control device. In one embodiment, GRE (generic routing encapsulation) tunnels are used. However, as will be apparent to those skilled in the art other types of tunnels, including IPSec tunnels, can also be used. Tunneling encapsulates the original packet in its entirety into a new packet with different source and destination addresses. The new packet is sent using the new packet's source and destination addresses. The matching route control device decapsulates the packet and forwards the original packet on to its original destination. Tunneling and encapsulation control routing by controlling the source and destination addresses of the new packet.

Figure 4:
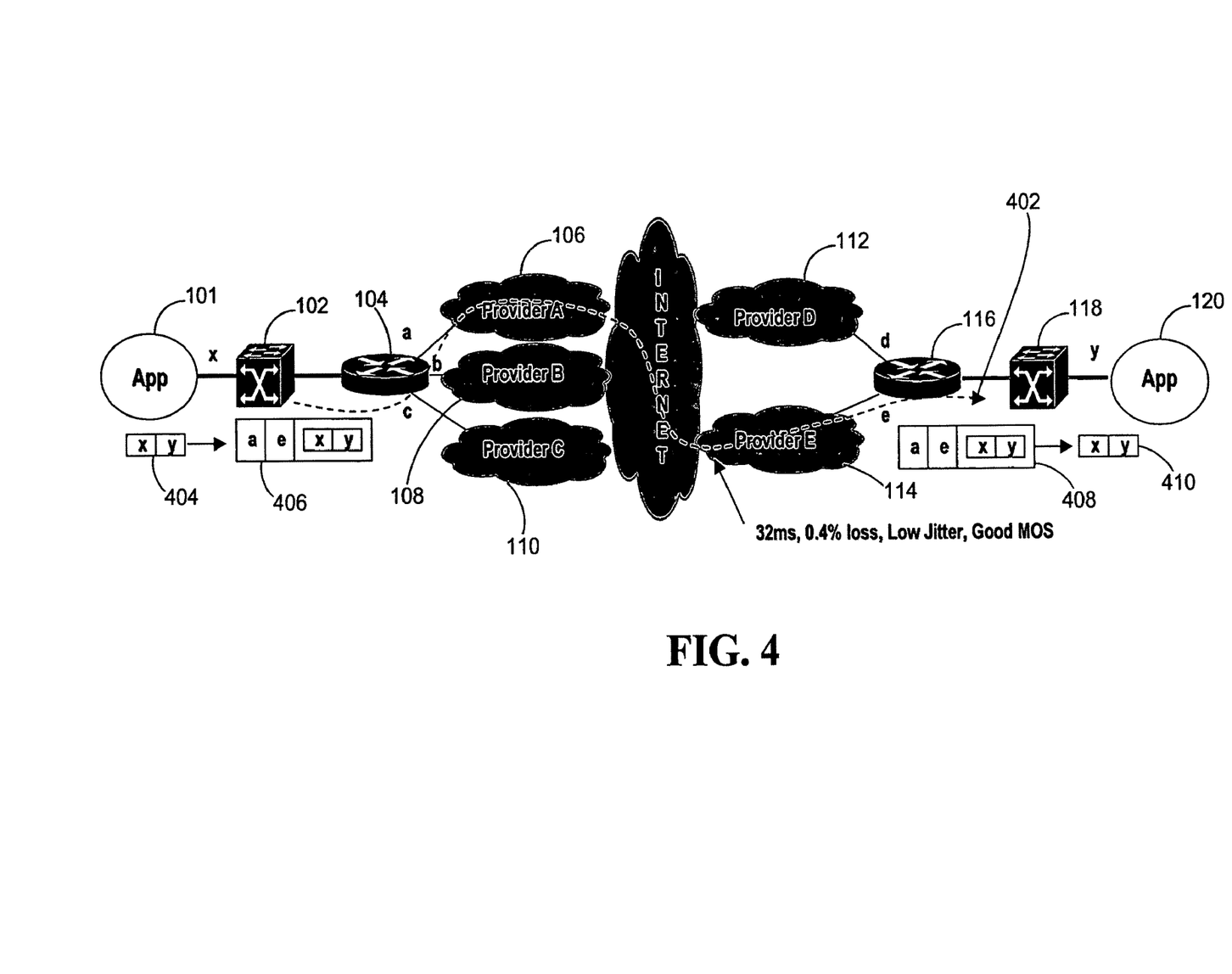
FIG. 4 is a block diagram illustrating end to end route control using tunneling, in accordance with an embodiment of the invention.

FIG. 4 illustrates an exemplary tunneling implementation. An outbound packet is routed from the source 101 to the destination 120 and an inbound packet is routed from the destination 120 to the source 101. The source application has an address space "x" and the destination application has an address space "y." Assuming that the traffic meets the end to end routing criteria and that both route control devices support end to end route control, then the route control devices determine a route for the traffic between the source and the destination. In the example illustrated by FIG. 4, the route traverses Provider A 106 and Provider E 114. The original packet includes a source address "x" and a destination address "y." The original packet is encapsulated in a new packet 406 with a source address of "a" and a destination address of "e" so that the outbound traffic is routed out Provider A 106 and through Provider E 114 to the destination and the inbound traffic is routed out Provider E and through Provider A to the source. When the destination route control device receives the new packet, it decapsulates the packet and forwards the original packet out an interior interface towards the destination application with destination address "y."

The route control devices 102 and 118 shown in FIG. 4 can be layer 3 route control devices, as described in more detail above with reference to FIGS. 2A and 2B. If secondary addresses are used, then the downstream routers 104, 116 use the secondary addresses to select a particular provider.

Figure 5:
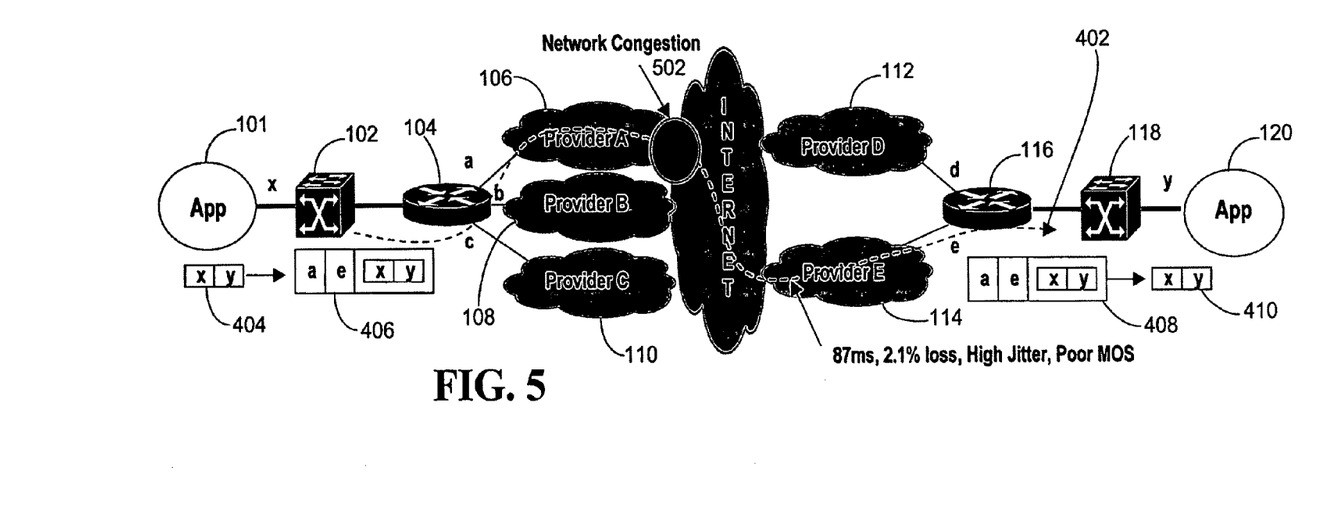
FIG. 5 is a block diagram illustrating a performance problem with a path, in accordance with an embodiment of the invention.

The route through Providers "A" and "E" is selected based on performance monitoring and measurement performed by the route control devices. The route control devices continue to monitor the path performance during a session. If a degradation in performance is detected, such that the path performance falls below a predetermined threshold, then the route control devices identify a new path. FIG. 5 illustrates the situation where the path through providers "A" and "E" becomes unacceptable due to network congestion 502.

Figure 6:
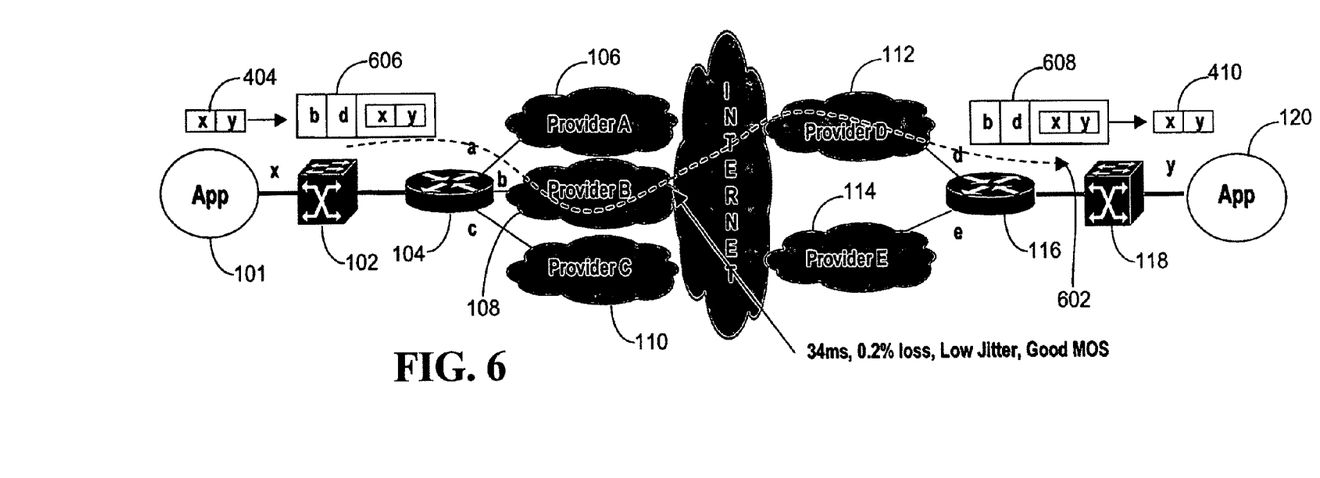
FIG. 6 is a block diagram illustrating selection of a new path for end to end route control, in accordance with an embodiment of the invention.

In response, the route control devices select a new path and begin routing using the new path. As shown in FIG. 6, the route control devices determine that a path through Provider "B" and Provider "D" is a better path. Exemplary methods for detecting the performance degradation and measuring the performance of alternate paths are discussed in the patent application cited above in the section entitled "Implementations." As shown in FIG. 6, the original packet is encapsulated by new packet 606 in which the source address of the new packet is set to "b" and the destination address of the new packet is set to "d." The packet is routed out through Provider "B" and through Provider "D" to the destination route control device.

The source address "b" is used for inbound traffic from the destination 120 to the source 101. The outbound traffic from the source can use any provider. The provider is typically selected per the routing table entry for address "d" in router 104. Although the paths shown in the figures are symmetric, the invention does not require symmetric paths.

If the optimized routing mode uses tunneling, then the issue of fragmentation must be addressed. Depending on the size of the original packet, once the original packet is encapsulated into a new packet, the new packet may exceed the MTU (maximum transmission unit) of the network. If so, then the route control device fragments the packet into smaller packets. To avoid the overhead associated with fragmentation, local applications should reduce their local MTU by the size of the header for the new packet so that the new packet does not exceed the MTU of the network. Some applications set the "don't fragment" flag in the IP header to indicate that the packet should not be fragmented by downstream network elements. However, for end to end route control, this flag can be ignored since the original packet will be reformed from the fragments at the destination route control device.

Multi-Path Tunneling and Encapsulation

Figure 7:
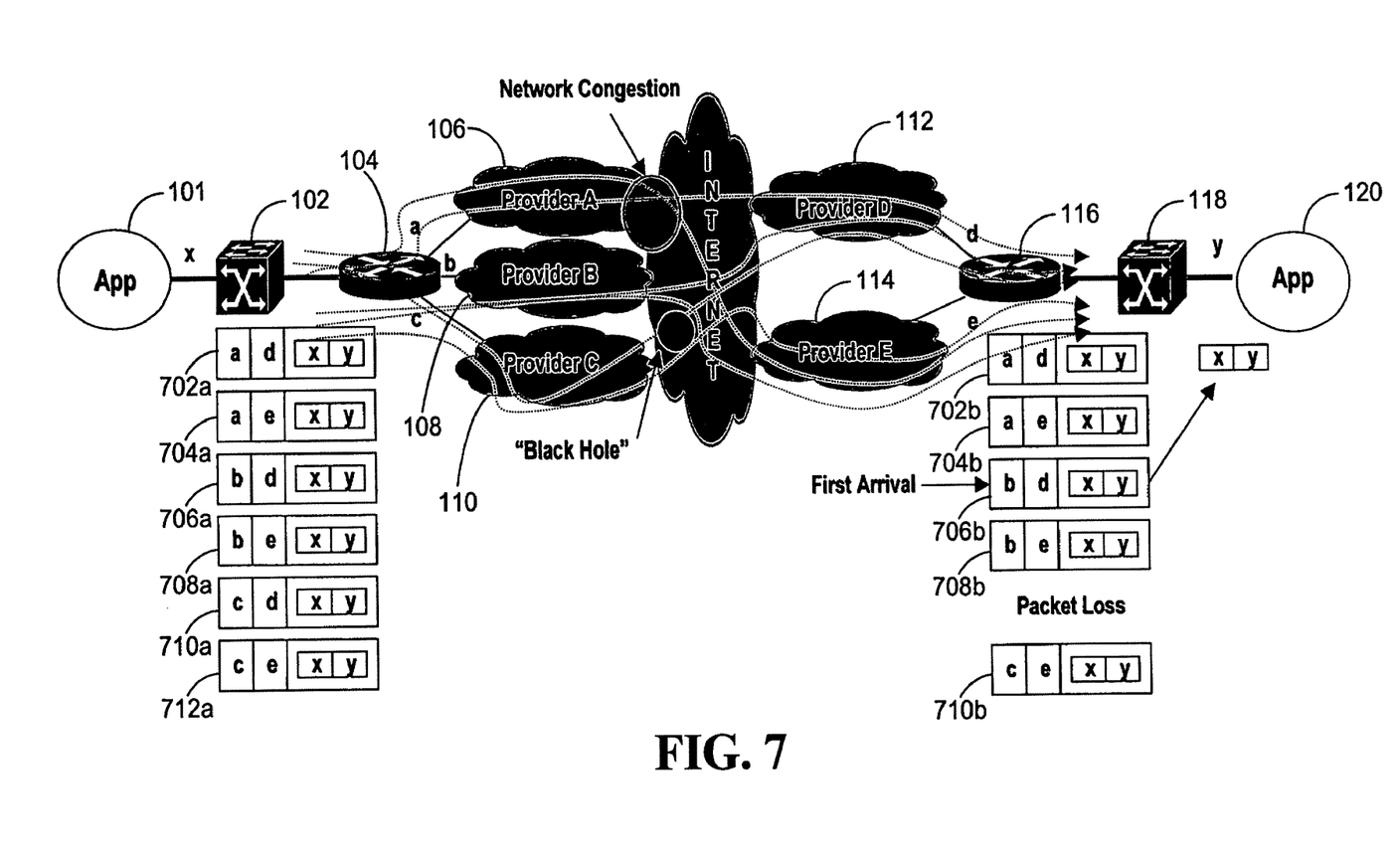
FIG. 7 is a block diagram illustrating multipath end to end route control using tunneling, in accordance with an embodiment of the invention.

FIGS. 4, 5, and 6 illustrate the use of a single path between the route control devices. The single path embodiment can be extended to a multi-path embodiment, which concurrently provides multiple paths between the route control devices, as illustrated by FIG. 7. In FIG. 7, there are six paths, which include every combination of source and destination providers. Six new packets 702a, 704a, 706a, 708a, 710a, 712a, encapsulate the original packet from "x" to "y" and traverse six different paths. The first path is out Provider "A" and through Provider "D," the second path is out Provider "A" and through Provider "E," the third path is out Provider "B" and through Provider "D," the fourth path is out Provider "B" and through Provider "E," the fifth path is out Provider "C" and through Provider "D" 710A, and the sixth path is out Provider "C" and through Provider "E."

The destination route control device reconstructs the original session using the new packet that arrives first and discards the remaining packets. In the example illustrated by FIG. 7, the first arriving packet is 706b, which was routed out Provider "B" and through Provider "D." The first arriving packet is decapsulated and the original packet is sent on to the destination. The remaining received packets 702b, 704b, 708b, and 712b are discarded. The packet corresponding to 710a was lost and thus never received by destination route control device. The destination route control device can identify duplicate packets by the IPID field and the source and destination addresses in the IP header of the original packet.

Multi-path end to end routing ensures that the best available path is used and minimizes the impact of any network disruptions on the applications. However, it is expensive in terms of bandwidth, since each packet is replicated N times for N possible paths. Thus, the inventors anticipate that multi-path end to end routing will be used for critical applications, such as VoIP, video conferencing, on-line gaming, remote backup and restoration of network based storage, sessions associated with service agreements providing a high level of service, or used when the network measurements have determined that the underlying network is particularly unstable or is performing poorly.

In addition to actual routing, multi-path end to end routing can be used for candidate path measurement to determine the performance of the possible paths. Once the path with the best performance is identified, single path end to end route control can be employed. In this embodiment, multi-path routing is used when the network conditions degrade. Alternative embodiments use multi-path routing periodically in place of active measurement to ensure that the optimal path is selected.

Address Translation

Figure 8A:
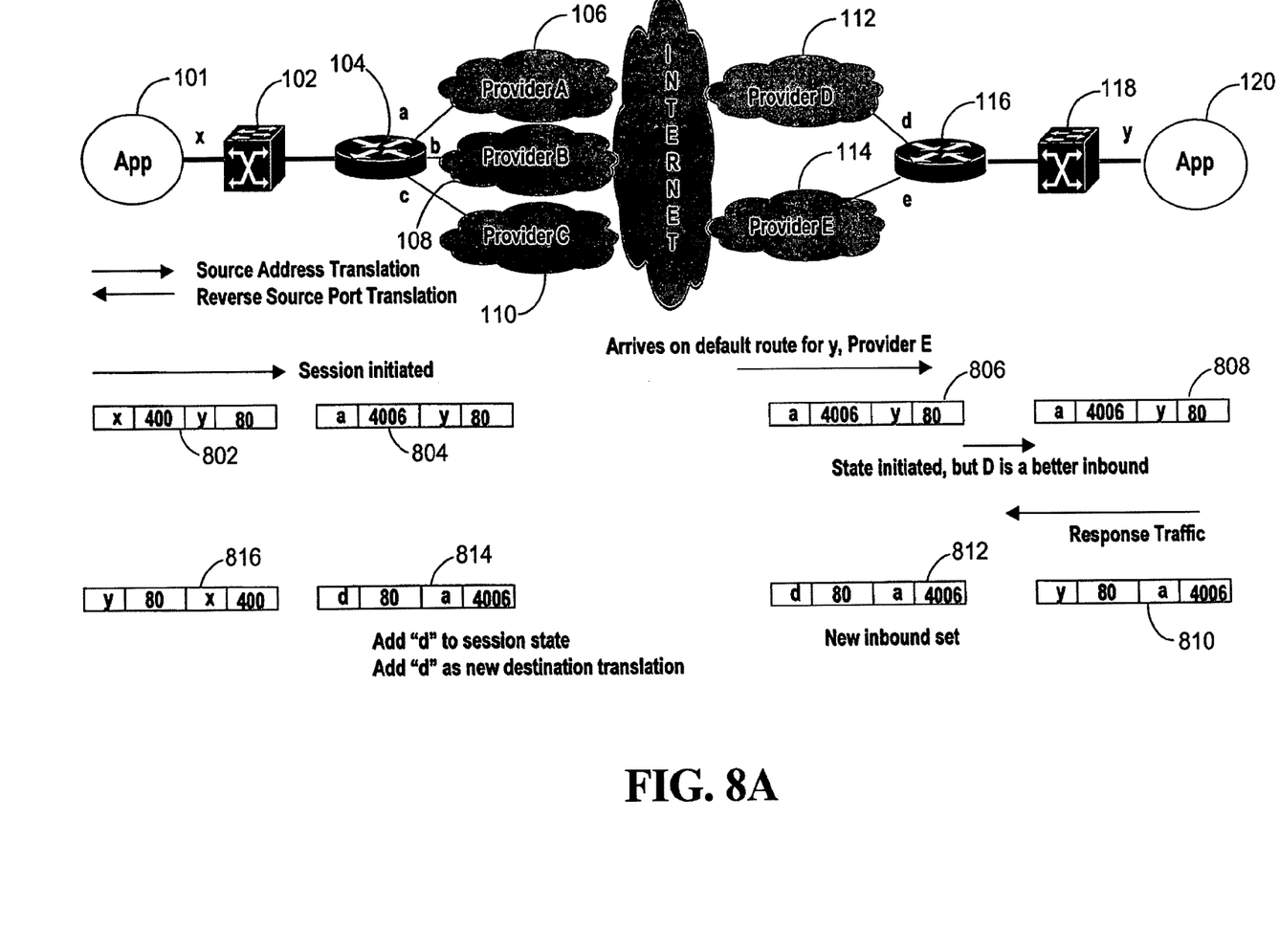
FIG. 8A is a block diagram illustrating end to end route control using address translation, in accordance with an embodiment of the invention.

Another mode of end to end route control uses address translations at both route control devices. The address translations are dynamic, i.e. the source address and or the destination address can be changed within a session, so that path changes can be made during a session, instead of between sessions. FIG. 8A illustrates address translation for an original packet 802 with a source address of "x" and a destination address of "y." As in the tunneling embodiments, the route control devices monitor path performance for paths through different providers. In the example illustrated by FIG. 8A, the source route control device determines that the outbound traffic from the source to the destination should be routed out Provider B and the inbound traffic from the destination to the source should be routed through Provider A. Therefore, the source route control device translates the original packet 802 having source address "x" and source port "400" to a translated packet 804 having source address "a" and source port "4006". The translated packet is routed out Provider B by the source route control device. The remainder of the routing of the translated packet follows default routing for the original destination address "y." In the example illustrated by FIG. 8A, the translated packet is routed through Provider E to the destination control device. However, the destination route control device determines that Provider D is a better provider. The destination route control device translates the received packet 808 having source address "a" and source port "4006" and destination address "y" and destination port "80" to a packet 812 having source address "a" and source port "4006" and destination address "d" and destination port "80."

When the source route control device receives the packet translated by the destination route control device 814, it determines that the destination address differs from the destination address of the packet it sent 804 and uses the new destination address for its next packet.

Figure 8B:
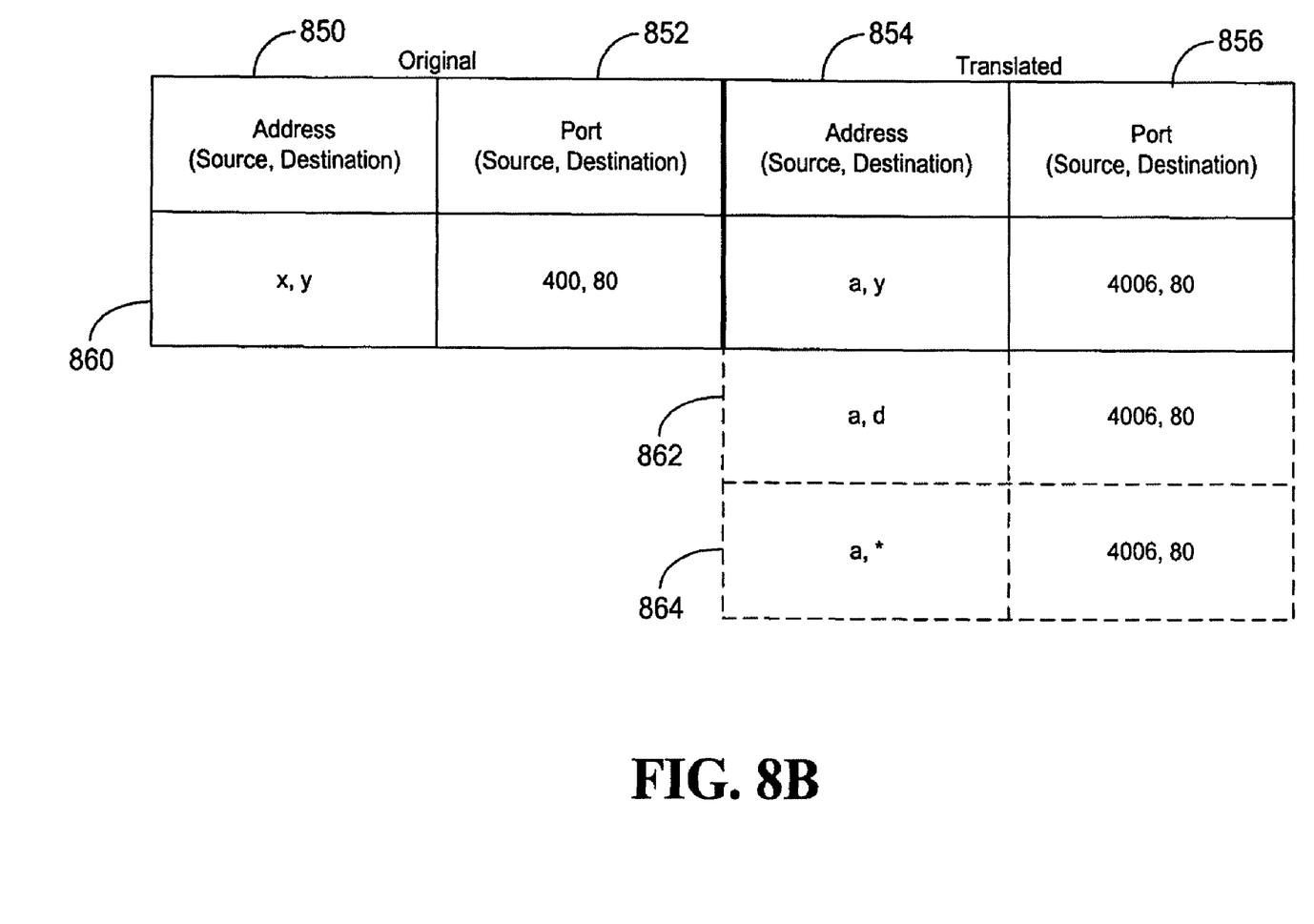
FIG. 8B illustrates a translation table, in accordance with an embodiment of the invention.

The source route control device maintains a translation table, as illustrated in FIG. 8B. The table includes a row 860 for each translation. A pair of columns 850 and 852 includes the source and destination addresses and ports for a packet received by the source route control device. A second pair of columns 854 and 856 includes the translated source and destination addresses and ports. Thus, row 860 of FIG. 8B illustrates that a received packet having a source address "x", source port "400", destination address "y" and destination port "80" is translated to a packet having a source address "a", source port "4006", destination address "y" and destination port "80".

Once the source route control device receives the packet from the destination route control device having a source address "x", source port "4006", destination address "d" and destination port "80", the difference in the destination addresses causes a change in the table. The translation of row 860 is modified so that the information shown at 864 is substituted for the previous information in columns 854 and 856. The substituted information includes a wildcard "*" for the destination address. Alternatively, the substituted information could include multiple destination addresses, such as "y" and "d". The source route control device sends a subsequent packet train using the destination address most recently received, i.e. the information shown at 862. As illustrated by FIGS. 8A and 8B, the table accommodates more than one address translation per port translation, i.e. it provides "polyNAT" or "poly-PAT" translations. The destination route control device maintains a similar table and updates it in a similar manner so that the addresses can be translated at either end. The process described by FIGS. 8A and 8B continues throughout the session so that the paths can be modified throughout the session if necessary. To preserve the state table, the route control devices can communicate all possible translations up front (as described above), which eliminates the need for a wildcard entry in the table and permits better scaling when many route control devices are used.

Address translation avoids the fragmentation issues described above in connection with tunneling, but may require additional translations in the payload of the packets. For example, the payload of H.323 traffic contains information about the original source and destination addresses, as well as ports. Any change to the header fields will disrupt the integrity of the session. To avoid this disruption, the fields in the payload of the packets are translated whenever any address translation is performed for end to end route control.

Address translation can also be used in a multi-path embodiment. All possible translations are made and duplicate packets are transmitted. The IPID and the destination port can be used to uniquely identify duplicate packets.

One-Way Path Measurements

Figure 9A:
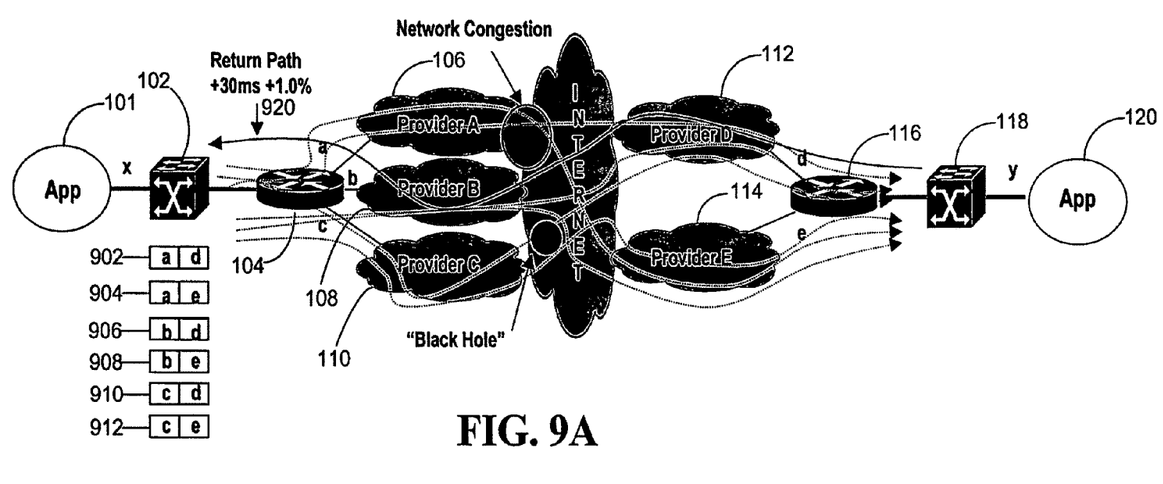
FIG. 9A is a block diagram illustrating one-way path measurements, in accordance with an embodiment of the invention.

Path performance measurements are a key component of end to end route control. Performance measurements are used to select an initial path, as well as to determine when a path change is needed. As described above, multi-path routing can be used for path measurement. Additional measurement techniques are discussed in connection with FIGS. 9A, 9B, 10A and 10B. FIG. 9A illustrates the use of active probes to determine the performance of the outbound paths from the source route control device. In this example, there are six possible paths 902, 904, 906, 908, 910, and 912. The active probes traverse each of the six outbound paths using the specified providers and all of the probes traverse the same inbound path. Thus, the outbound path differs for each of the paths but the inbound path is the same for all of the paths. By forcing the inbound path to be the same, the effects of the inbound path are eliminated from the measurements, providing information about the one-way performance of the paths.

Figure 9B:
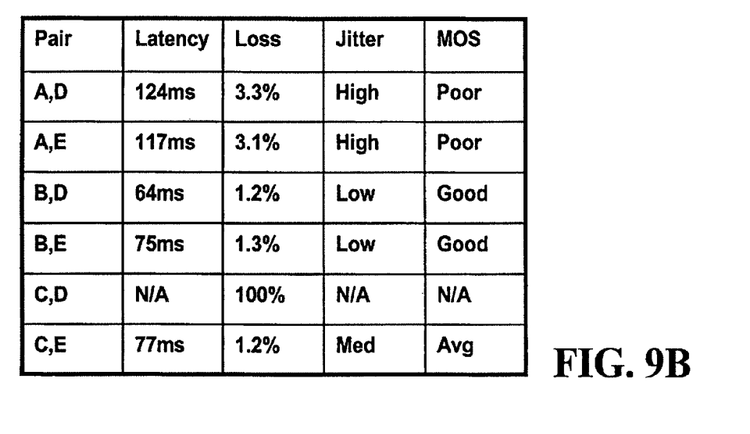
FIG. 9B illustrates one-way path measurements, in accordance with an embodiment of the invention.

FIG. 9B provides a table illustrating exemplary path measurements in accordance with FIG. 9A. The source addresses shown in the packets 902, 904, 906, 908, 910, 912 illustrated in FIG. 9A are not the literal source addresses but indicate the outbound path that is used. Thus, the source address is decoupled from the outbound path selection. In this manner, the measurements can utilize the same inbound path, but measure different outbound paths. Any inbound path can be selected, so long as the same inbound path is selected for all paths. To avoid a single path anomaly from disrupting or disturbing results, a different inbound path that uses a different source address is used for each measurement interval.

Figure 10A:
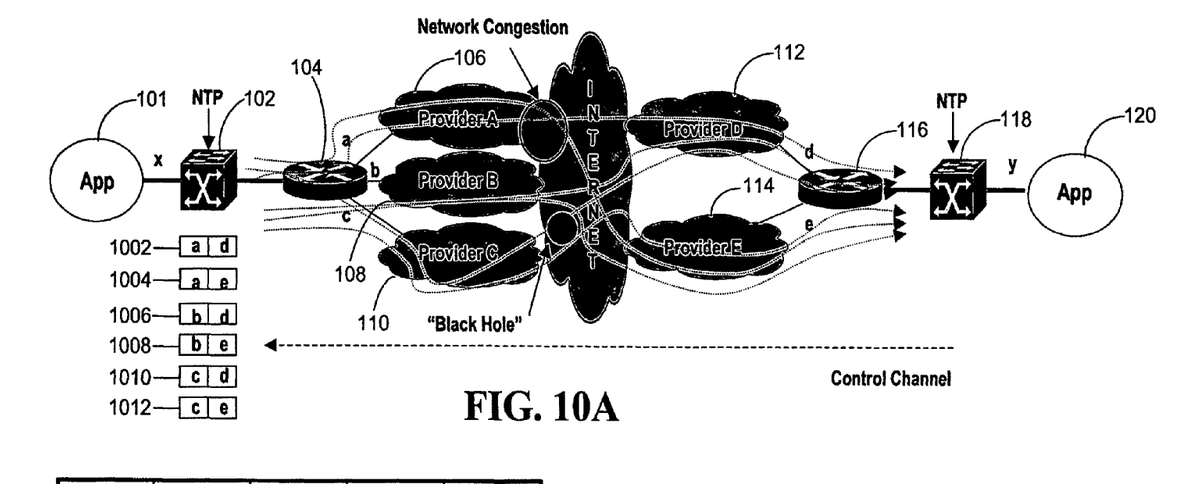
FIG. 10A is a block diagram illustrating one-way path measurements, in accordance with another embodiment of the invention.
Figure 10B:
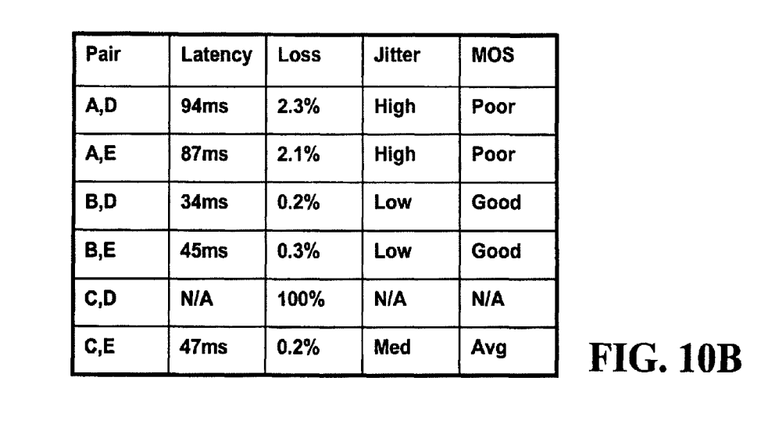
FIG. 10B illustrates one-way path measurements, in accordance with an embodiment of the invention.

Another one-way path measurement technique is illustrated by FIG. 10A. Synchronized clocks at the source route control device and the destination route control device are used to measure the path characteristics. In one embodiment the synchronized clocks used at the source route control device and the destination route control device use the network time protocol (NTP) or another similar mechanism. Active probes are sent out through all the possible outbound paths. FIG. 10A illustrates six paths. The first path is out Provider "A" and through Provider "D" 1002, the second path is out Provider "A" and through Provider "D" 1004, the third path is out Provider "B" and through Provider "D" 1006, the fourth path is out Provider "B" and through Provider "E" 1008, the fifth path is out Provider "C" and through Provider "D" 1010, and the sixth path is out Provider "C" and through Provider "E" 1012. Upon receiving the outbound probes, the destination route control device determines the performance characteristics of the paths and provides performance information to the source route control device via a control channel, such as the control channel of a VoIP session, a separate sessions dedicated to performance measurements, or a back channel. Using a control channel prevents the return path of the probe from factoring into the measurements. FIG. 10B illustrates exemplary measurements for the example of FIG. 10A. The measurement techniques described in connection with FIGS. 9A and 10A are traditionally performed at layer 3. In the case of a layer 2 implementation, a mechanism would be needed to observe the probes, capture the probes, and respond to them.

Reporting

Route control includes a reporting function. Routing information is stored as part of the routing process and is available for planning purposes, trouble-shooting, and improved day-to-day network operation. The present invention provides information on a set of route control devices, instead of information on a single device, as provided by current route control techniques. By providing information on a set of route control devices, the management of multiple devices is easier since all of the reporting information for the devices is available from a single console. In addition, a single policy can be input at one console and then applied to the route control devices throughout the network.

Figure 11:
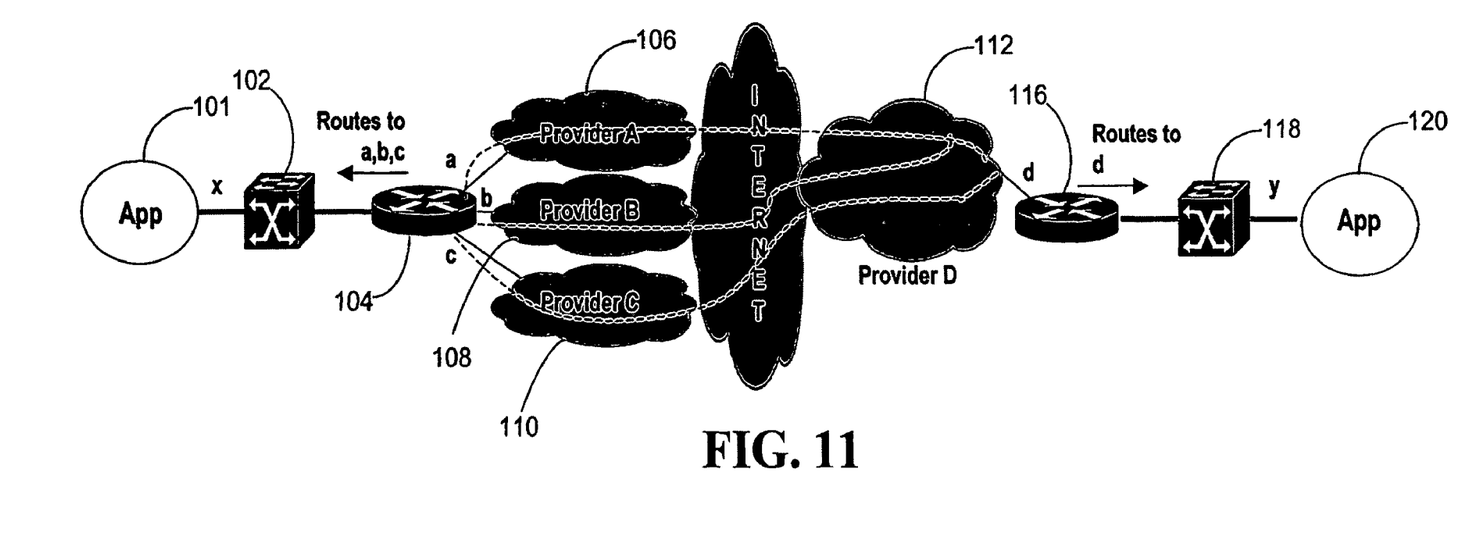
FIG. 11 is a block diagram illustrating endpoints and another exemplary network configuration.

Although the embodiments described above are multi-homed at both ends, i.e. there are multiple source providers and multiple destination providers, the invention is not limited to such multi-homed networks. So long as at least one of the endpoints is multi-homed, the invention provides significant benefits over existing routing since path changes can be made during a session and multi-path applications are available. FIG. 11 illustrates a network configuration where the source route control device 102 is multi-homed to Provider A 106, Provider B 108 and Provider C 110 and the destination route control device 118 is single homed to Provider D 112. As shown in FIG. 11, multiple paths are available and the multiple paths provide some degree of diversity through Provider D.

Additional alternative embodiments will be apparent to those skilled in the art to which the present invention pertains without departing from its spirit and scope. For example, even though the examples provided herein are implemented at layer 3, the invention can also be implemented at layer 2. The invention is also applicable to embodiments that involve OEM software on existing products, such as VPN. For example, the tunneling described herein could reside on existing VPN devices.

Furthermore, the invention is not limited to stand alone route control devices. The invention can be implemented in the network stack of a client or a server. By implementing the invention in software on the client, end to end route control can be widely deployed, without deploying hardware in each location. Accordingly, the scope of the present invention is described by the appended claims and is supported by the foregoing description.

What is claimed is:

1. A method for determining one-way path performance in a network that includes a source route control device and a destination route control device, wherein the source route control device is connected to at least two source network service providers and the destination route control device is connected to at least one destination network service provider, so that there are a plurality of outbound paths from the source route control device to the destination route control device via the at least two source network service providers, comprising:

determining an inbound path from the destination route control device to the source route control device, wherein the inbound path is associated with a selected one of the source network service providers and a selected one of the destination network service providers;

probing each of the outbound paths to determine performance associated with each of the outbound paths by traversing each of the outbound paths from the source route control device to the destination route control device and traversing the inbound path, so that the inbound path is traversed for all outbound paths.

2. The method of claim 1, wherein the probing is performed periodically.

3. The method of claim 1, wherein the performance is latency.

4. The method of claim 1, wherein the performance is loss.

5. The method of claim 1, wherein the performance is jitter.

6. The method of claim 1, wherein the performance is mean opinion score.

7. A method for determining one-way path performance in a network that includes a source route control device and a destination route control device, wherein the source route control device is connected to at least two source network service providers and the destination route control device is connected to at least one destination network service provider, so that there are a plurality of outbound paths from the source route control device to the destination route control device via the at least two source network service providers, and wherein the source route control device and the destination route control device are time synchronized, comprising:

for each of the outbound paths:

probing the outbound path by traversing the outbound path from the source route control device to the destination route control device;

receiving, at the source route control device, performance information for the outbound path from the destination route control device via the same control channel, wherein the control channel is one of a control channel of a VoIP session, a separate session dedicated to performance measurement, or a back channel.

8. The method of claim 7, wherein the source route control device and the destination route control device are time synchronized using the Network Time Protocol (NTP).

9. The method of claim 7, wherein the probing is performed periodically.

10. The method of claim 7, wherein the performance information is related to latency.

11. The method of claim 7, wherein the performance information is related to loss.

12. The method of claim 7, wherein the performance information is related to jitter.

13. The method of claim 7, wherein the performance information is related to mean opinion score.

* * * * *